(12) United States Patent
Sakurai et al.

(10) Patent No.: US 6,684,000 B1
(45) Date of Patent: *Jan. 27, 2004

(54) IMAGE SENSING DEVICE CAPABLE OF OUTPUTTING IMAGE SIGNALS BY BLOCKS AND PROCESSING CIRCUIT WHICH PROCESSES IMAGE SIGNALS BY BLOCKS

(75) Inventors: Katsuhito Sakurai, Machida (JP); Shigetoshi Sugawa, Atsugi (JP); Isamu Ueno, Hadano (JP); Katsuhisa Ogawa, Machida (JP); Toru Koizumi, Yokohama (JP); Tetsunobu Kochi, Hiratsuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/346,683

(22) Filed: Jul. 2, 1999

(30) Foreign Application Priority Data

Jul. 3, 1998 (JP) ............................................. 10-189526
Jul. 7, 1998 (JP) ............................................. 10-192190

(51) Int. Cl.[7] ............................. G06K 9/20; G06K 9/00; H04N 5/228
(52) U.S. Cl. ..................... 382/324; 382/166; 348/222.1
(58) Field of Search ................................. 382/166, 312, 382/300, 324, 321; 348/222.1, 223.1, 279, 234, 272; 358/296

(56) References Cited

U.S. PATENT DOCUMENTS

| 4,635,122 A | * | 1/1987 | Kato et al. ................... 348/319 |
|---|---|---|---|
| 4,985,758 A | * | 1/1991 | Hashimoto ................... 348/283 |
| 5,130,786 A | * | 7/1992 | Murata et al. ........... 375/240.25 |
| 5,132,803 A | * | 7/1992 | Suga et al. ................... 348/315 |
| 5,216,516 A | | 6/1993 | Tanaka et al. ............... 358/426 |
| 5,255,090 A | * | 10/1993 | Israelsen ................. 375/240.12 |
| 5,568,192 A | | 10/1996 | Hannah ....................... 348/222 |
| 5,901,257 A | * | 5/1999 | Chen et al. .................. 382/312 |
| 5,920,343 A | | 7/1999 | Watanabe et al. ........... 348/222 |
| 5,933,572 A | * | 8/1999 | Nagasawa et al. ........... 386/120 |
| 6,124,888 A | | 9/2000 | Terada et al. ............... 348/302 |

FOREIGN PATENT DOCUMENTS

| EP | 0 800 317 A2 | 10/1997 | ............. H04N/9/04 |
|---|---|---|---|
| EP | 0 926 901 A2 | 6/1999 | ............. H04N/9/04 |
| JP | 9-55884 A | 2/1997 | ........... H04N/5/335 |
| JP | 9-247689 A | 9/1997 | ............. H04N/9/07 |

OTHER PUBLICATIONS

PASIC: A processor–A/D converter–Sensor Integrated Circuit, Chen, K. et al., IEEE International Symposium on Circuits and Systems, 1990, vol. 3, pp. 1705–1708.*

* cited by examiner

*Primary Examiner*—Wenpeng Chen
(74) *Attorney, Agent, or Firm*—Fitzpatrick, Cella, Harper & Scinto

(57) ABSTRACT

Control to read signals from a sensor unit having a plurality of pixels by pixel blocks of a predetermined size, and the read signals are processed into pseudo luminance and color signals by pixel blocks of the predetermined size.

23 Claims, 18 Drawing Sheets

FIG. 3

| Ye | Mg |
|----|----|
| Cy | Gr |

| Ye | Cy |
|----|----|
| Mg | Gr |
| Ye | Cy |
| Gr | Mg |

| Ye + Mg | Cy + Gr |
|---------|---------|
| Ye + Gr | Cy + Mg |

| R | G |
|---|---|
| G | B |

~ 203

FLAG INDICATIVE OF COMPLEXION

FIG. 12A

| R | G1 |
|---|---|
| G2 | B |

FIG. 12B

| Cy | Ye |
|---|---|
| Gr | Mg |

IMAGE SENSING DEVICE CAPABLE OF OUTPUTTING IMAGE SIGNALS BY BLOCKS AND PROCESSING CIRCUIT WHICH PROCESSES IMAGE SIGNALS BY BLOCKS

BACKGROUND OF THE INVENTION

The present invention relates to an image sensing device for obtaining color image signals, an image sensing apparatus and an image sensing system using the image sensing device, an image processing method, and a computer readable storage medium storing program codes of the image processing method.

Conventionally, there is an image sensing apparatus which acquires image signals (color image signals) of an object using an image sensing device, covered with a color filter, on which an optical image of the object is formed, applies image processes, such as compression and expansion, to the acquired image signals, and displays the processed image signals and/or records the processed image signals in a storage medium.

In compression processing performed in such an image processing apparatus, image signals outputted from the image sensing device are divided into blocks of a predetermined size, applied with, e.g., discrete cosine transformation, quantization, and/or variable length coding by blocks, and compressed data is obtained.

As processes to be performed in advance of image processes, such as compression, (referred to as "pre-processing" hereinafter) signals output from the image sensing device (specifically, if color filters covering the image sensing device are complementary color filters, the output signals are Ye (yellow), Cy (cyan), Mg (magenta) and Gr (green) raw signals, and if they are primary color filters, the output signals are R (red), G (green) and B (blue) raw signals) are temporarily stored in frame memory or line memory, applied with color processes, such as white balance correction and γ correction, then a luminance signal Y and color difference signals U and V are obtained on the basis of the processed signals. Then, the aforesaid image processes, such as compression, are applied to the luminance signal Y and the color difference signals U and V obtained as a result of the pre-processing.

Further, as another example of the image processes, besides compression, performed after the pre-processing, there is a process for determining whether or not a given color is a complexion (complexion recognition) for discriminating a human in an image.

FIG. 22 is a block diagram illustrating a brief configuration of a conventional image sensing apparatus capable of performing the complexion recognition. As shown in FIG. 22, the image sensing apparatus converts analog image signals outputted from a CCD (image sensor) 101 into digital signals in an analog-digital (A/D) converter 102, and stores a predetermined amount of digital signals (e.g., data of two lines) in line memory 103.

Thereafter, the image data stored in the line memory 103 is applied with color processes, such as white balance correction and γ correction, by blocks of, e.g., 2×2 pixels in a color processing circuit 104, and a luminance signal Y and color difference signals U and V are generated. Then, the color difference signals U and V are provided to a complexion determination circuit 105, where whether a color, expressed by the color difference signals U and V, is a complexion or not is determined on the basis of the color difference signals U and V.

In the aforesaid conventional image sensing apparatus, image signals are serially outputted; therefore, the frame memory or line memory for the pre-processing is necessary. Further, time for waiting until image signals necessary for pre-processing are stored in the frame memory or line memory is required. Furthermore, considerably large number of operations are to be performed in the pre-processing, which has limited to increase throughput.

Thus, the image processes, such as compression and complexion determination, which are subsequent processes to the pre-processing are not performed efficiently in the conventional image sensing apparatus.

SUMMARY OF THE INVENTION

The present invention has been made in consideration of the above situation, and has as its object to provide an image sensing device capable of performing high precision image processes efficiently.

According to the present invention, the image sensing device comprises a sensor unit having a plurality of pixels; control means for controlling to read signals from the sensor unit by pixel blocks of a predetermined size; and signal processing means for acquiring luminance and color difference information on the basis of the signals, read from the sensor unit, by pixel blocks of the predetermined size.

It is another object of the present invention to provide an image sensing device capable of performing color determination processing for a given pixel.

According to the present invention, the image sensing device further comprises color determination means for determining whether or not the color difference information acquired by the signal processing means represents predetermined color.

Further, it is still another object of the present invention to provide an image sensing apparatus and an image sensing system using either of the aforesaid image sensing devices, an image processing method, and a computer readable storage medium storing program codes of the image processing method.

According to the present invention, the image sensing apparatus includes a sensor unit having a plurality of pixels; control means for controlling to read signals from the sensor unit by pixel blocks of a predetermined size; signal processing means for acquiring luminance and color difference information on the basis of the signals, read from the sensor unit, by pixel blocks of the predetermined size; and compression means for compressing the luminance and color difference information calculated by the signal processing means.

According to the present invention, the image processing method comprises a reading step of reading signals of a plurality of pixels by pixel blocks of a predetermined size; and a signal processing step of acquiring luminance and color difference information on the basis of the signals read by pixel blocks of the predetermined size in the reading step.

According to the present invention, the computer readable storage medium includes program codes of the steps of either of the aforesaid image processing methods.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is an explanatory view showing raw signals read by four-pixel blocks;

FIG. 4A is an explanatory view showing raw signals read by eight-pixel blocks;

FIG. 4B is an explanatory view showing signals stored in 2×2 analog memory;

FIG. 5 is an explanatory view showing signals stored in the 2×2 analog memory when primary color filters are used;

FIG. 12A is a diagram illustrating an example of a basic unit of primary color filters;

FIG. 12B is a diagram illustrating an example of a basic unit of complementary color filters;

DETAILED DESCRIPTION OF THE PREFERRED EMBODIMENTS

Preferred embodiments of the present invention will be described in detail below in accordance with the accompanying drawings.

<First Embodiment>

Figure 1:
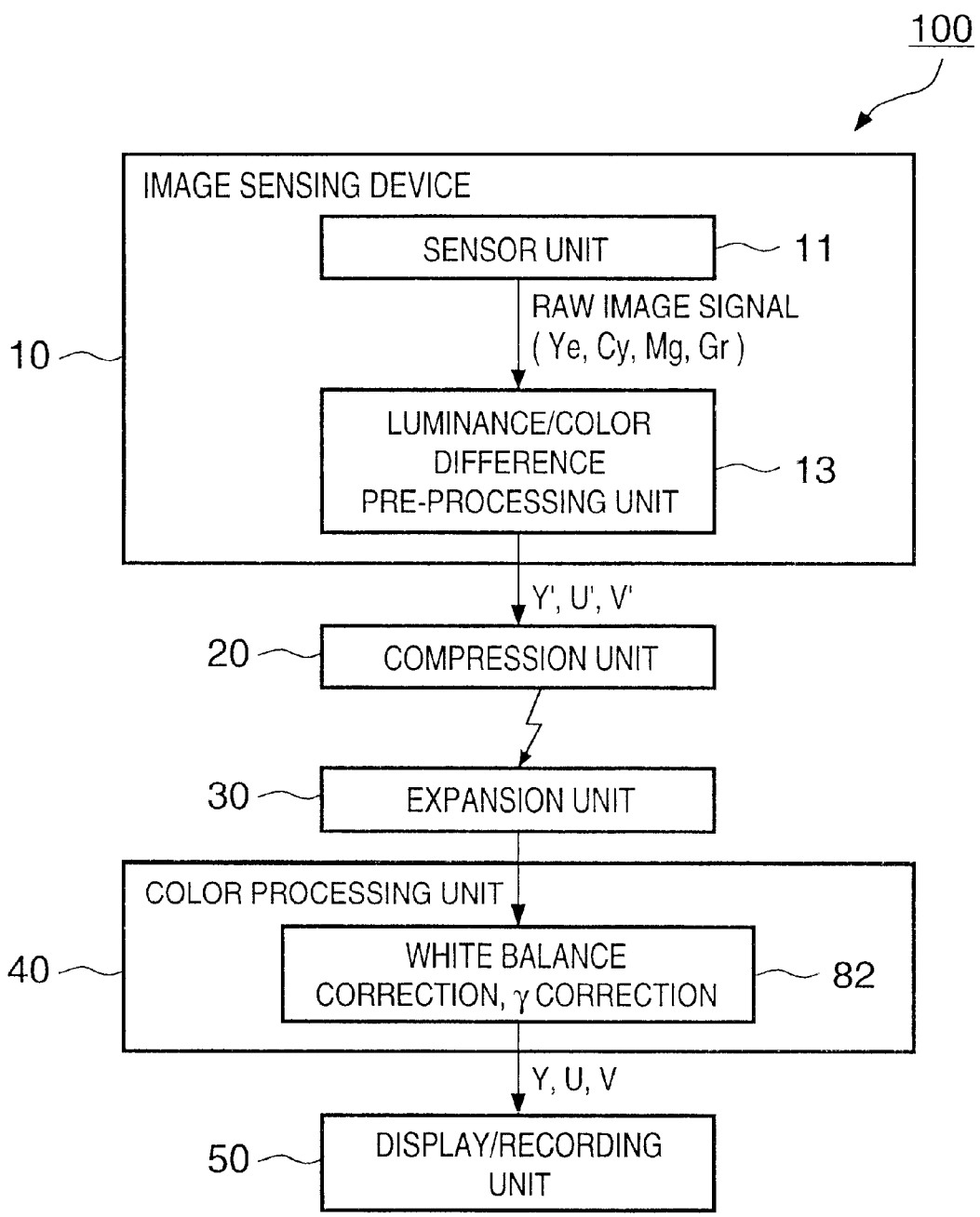
FIG. 1 is a block diagram illustrating an image sensing system according to a first embodiment of the present invention.

FIG. 1 is a block diagram illustrating an image processing system 100 to which the present invention is applied. In the image processing system 100, an image sensing apparatus (transmission side) which comprises an image sensing IC chip (referred to as "sensor unit" hereinafter) 10 and a compression unit 20 performs data communication with a reproduction apparatus (receiving side) which comprises an expansion unit 30, a color processing unit 40, and a display/recording unit 50.

First, an operational sequence of the image sensing system 100 is explained.

In the image sensing apparatus, the sensor unit 10 includes an image sensing device (light receiving device) 11, covered with a color filter, on which an optical image of an object is formed, and a luminance/color difference pre-processing unit 13 for generating pseudo (i.e., unprocessed) luminance signal Y' and color difference signals U' and V' on the basis of raw signals outputted from the image sensing device 11.

In the first embodiment, complementary color filters of yellow (Ye), cyan (Cy), magenta (Mg), and green (G) are used; therefore, a pseudo luminance signal Y' and pseudo color difference signals U' and V' are generated on the basis of the raw signals of four complementary colors Ye, Cy, Mg, and Gr, and outputted from the sensor unit 10.

The compression unit 20 applies compression processing using information compression technique, such as JPEG, MPEG, H.261, or vector quantization, to the pseudo luminance signal Y' and the pseudo color difference signals U' and V' outputted from the sensor unit 10.

In the first embodiment, the compression unit 20 applies discrete cosine transform (DCT) by pixel blocks to the pseudo luminance signal Y' and the pseudo color difference signals U' and V', thereafter, further quantizes the transformed signals Y', U' and V', thereby obtaining compressed data from which a high-frequency component is removed. Thereafter, the compression unit 20 encodes the compressed data. As for the coding method, any coding method may be used; especially, variable length coding in which codes having different lengths are assigned to data depending upon frequency of the data appearance can improve compression rate.

The compressed and encoded data by the compression unit 20 is transmitted to the expansion unit 30 of the reproduction apparatus (receiving side) via medium, such as a communication line.

In the reproduction apparatus, the expansion unit 30 performs an inverse operation of the DCT and quntization which had been performed in the compression unit 20 on the data transmitted from the image sensing apparatus, thereby reproducing the pseudo luminance signal Y' and the color difference signals U' and V'.

The color processing unit 40 performs various necessary corrections, such as color corrections of white balance correction and γ correction, for improving quality of an image on the pseudo luminance signal Y' and the color difference signals U' and V' obtained in the expansion unit 30. As a result, luminance signal Y and color difference signals U and V are generated.

The display/recording unit 50 displays and/or records the luminance signal Y and the color difference signals U and V generated by the color processing unit 40 on a display device and/or a recording medium.

In the image sensing system 100 having the aforesaid configuration, the distinctive configuration according to the first embodiment of the present invention is the sensor unit 10.

Figure 2:
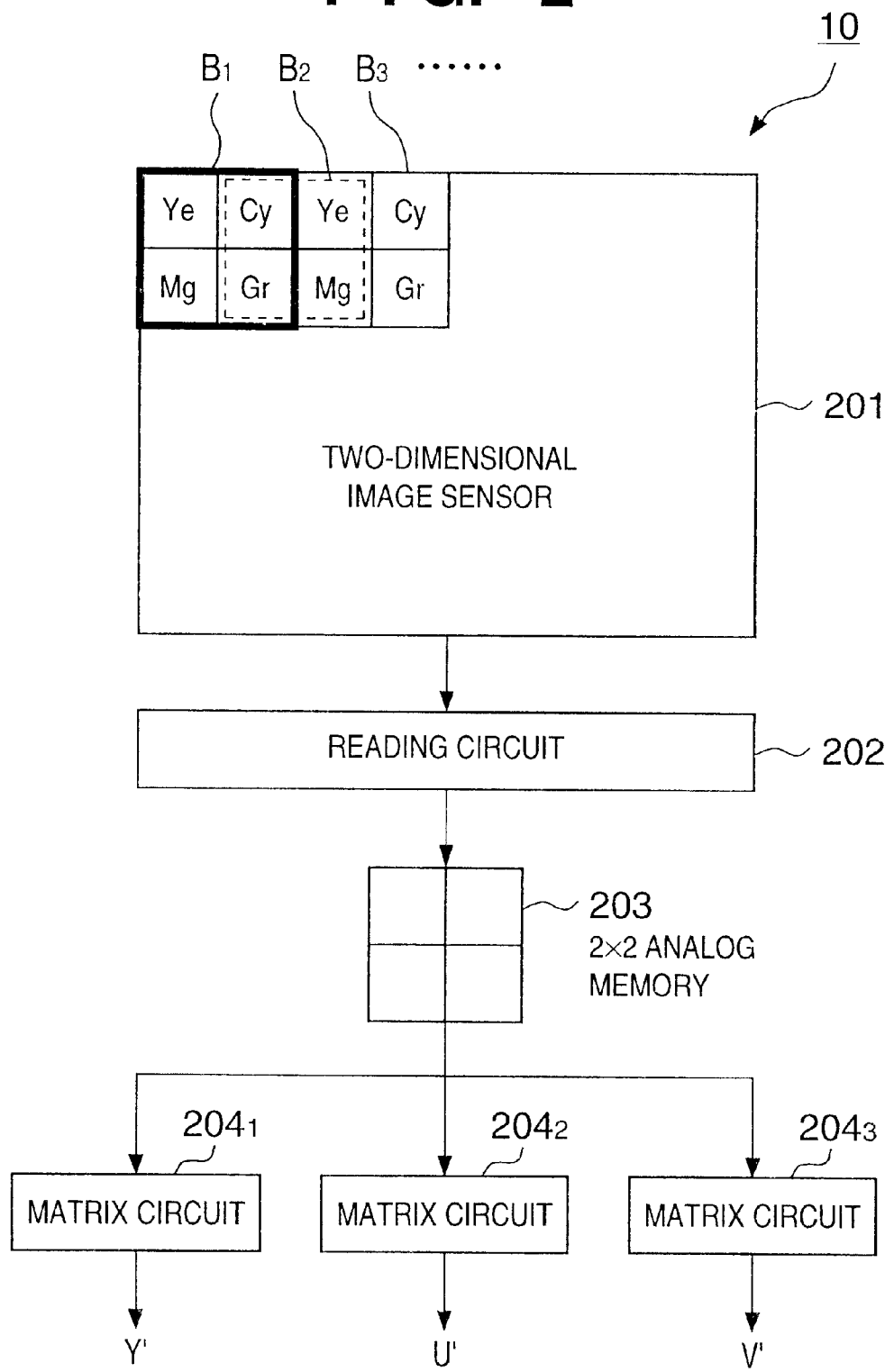
FIG. 2 is a block diagram illustrating a configuration of a sensor unit according to the first embodiment of the present invention.

Specifically, the sensor unit 10 has a configuration as shown in FIG. 2 and includes a two-dimensional image sensor 201 having a plurality of pixels (photodiodes) for receiving light from an object through the complementary color filters, a reading circuit 202 for scanning the pixels of the image sensor 201, converting the charges of the pixels into electric signals (raw signals) of Ye, Cy, Mg, and Gr and outputting them, 2×2 analog memory 203 where signals sequentially outputted from the reading circuit 202 are stored, and matrix circuits $204_1$ to $204_3$ for performing predetermined matrix operation on the signals stored in the memory 203, generating pseudo luminance signal Y' and pseudo color difference signals U' and V' and outputting them. The foregoing elements are formed on a single IC chip.

The sensor 201 and the reading circuit 202 correspond to the image sensing device 11 of FIG. 1, and the memory 203 and the matrix circuits $204_1$ to $204_3$ correspond to the luminance/color difference pre-processing unit 13 of FIG. 1.

The sensor unit 10 as described above operates in the following manner.

First, an optical image of an object incidents on the sensor 201. At this time, the optical image passes through the complementary color filters (not shown) of Ye, Cy, Mg, and Gr.

The reading unit 202 scans the pixels of the sensor 201 and converts charges accumulated in the respective pixels into electric signals (raw signals). Accordingly, raw signals Ye corresponding to light passed through yellow color filters, raw signals Cy corresponding to light passed through cyan color filters, raw signals Mg corresponding to light passed through magenta color filters, and raw signals Gr corresponding to light passed through green color filters are outputted from the reading unit 202.

At this time, the reading circuit 202 scans the sensor 201 by four-pixel blocks of 2×2 pixel array. For instance, as shown in FIG. 2, pixels which belong to a block $B_1$ are scanned, then pixels which belong to a block $B_2$, which is shifted from the block $B_1$ by a pixel in the horizontal direction, are scanned. Thereafter, pixels which belong to a block $B_3$, which is shifted from the block $B_2$ by a pixel in the horizontal direction, are scanned, and so on.

The reading circuit 202 obtains the raw signals Ye, Cy, Mg, and Gr by four-pixel blocks in the aforesaid manner, and the signal are stored in the 2×2 analog memory 203, as shown in FIG. 3.

The four raw signals Ye, Cy, Mg, and Gr stored in the memory 203 are outputted to the matrix circuits $204_1$ to $204_3$ in parallel.

The matrix circuits $204_1$ to $204_3$ respectively perform matrix operation on the raw signals Ye, Cy, Mg, and Gr outputted from the memory 203 and acquire the pseudo luminance signal Y' and the pseudo color difference signals U' and V'.

More specifically, the matrix circuit $204_1$ calculates the pseudo luminance signal Y' using, e.g., the following equation (1), $$Y'=Ye+MG+Cy+Gr \tag{1}$$

The matrix circuit $204_2$ calculates the pseudo color difference signal U' using, e.g., the following equation (2), $$U'=(Ye+Mg)-(Cy+Gr) \tag{2}$$

Further, the matrix circuit $204_3$ calculates the pseudo color difference signal V' using, e.g., the following equation (3), $$V'=(Cy+Mg)-(Ye+Gr) \tag{3}$$

Therefore, the pseudo luminance signal Y' and the pseudo color difference signals U' and V' obtained by the matrix circuits $204_1$ to $204_3$ are outputted from the sensor unit 10, and provided to the compression unit 20 of FIG. 1 in parallel.

According to the first embodiment as described above, the luminance/color difference pre-processing unit 13 for acquiring the pseudo luminance signal Y' and the pseudo color difference signals U' and V' from the raw signals of Ye, Cy, Mg and Gr outputted from the image sensing device 11 is formed on the same chip as the image sensing device 11. Accordingly, it is possible to improve operation speed for obtaining the pseudo luminance signal Y' and the pseudo color difference signals U' and V'. Consequently, image processes, such as compression processing and expansion processing, are performed efficiently.

Further, time saved by increasing the operation speed for obtaining the pseudo luminance signal Y' and the pseudo color difference signals U' and V' may be used for the image processes, such as compression processing and expansion processing; in this case, it is possible to improve image quality.

Further, color processes, such as white balance correction and γ correction, for improving image quality are performed by the color processing unit 40 after compression and encoding by the compression unit 20 and expansion by the expansion unit 30 are performed on the pseudo luminance signal Y' and the pseudo color difference signals U' and V' outputted from the sensor unit 10. Therefore, deterioration of an image due to block noise and high frequency noise caused by compression and expansion is reduced to a minimum, the amount of information to be transmitted via a communication line is greatly reduced, and deterioration of image signals, processed with color processes, due to compression/expansion is restrained; accordingly, it is possible to obtain a high quality image.

It should be noted that the sensor 201 shown in FIG. 2 is scanned by the reading circuit 202 by four-pixel blocks (e.g., $B_1$, $B_2$, $B_3$) of 2×2 pixels and four raw signals Ye, Cy, Mg, and Gr are obtained at a time; however, the present invention is not limited to this, and it is possible to scan the image sensor 201 by, e.g., eight-pixel blocks of 2×4 pixels as shown in FIG. 4A to obtain raw signals of two signals of Ye, two signals of Cy, two signals of Mg, and two signals of Gr at a time.

In this case, the reading circuit 202 performs predetermined operation as shown in FIG. 4B (addition of signals of two adjoining pixels in the vertical direction, in this case), obtains four signals (Ye+Mg), (Cy+Gr), (Ye+Gr), and (CY+MG) from the eight raw signals read from the image sensor 201, and stores the four signals to the 2×2 analog memory 203. The matrix circuits $204_1$ to $204_3$ respectively acquire pseudo luminance signal pseudo luminance signal Y and pseudo color difference signals U' and V' using, e.g., the aforesaid equations (1) to (3) on the basis of the four signals (Ye+Mg), (Cy+Gr), (Ye+Gr), and (CY+MG) stored in the memory 203.

Further, in the first embodiment, the sensor 201 is scanned by 2×2 pixel blocks while shifting the position of a block by a pixel, however, it is also possible to sequentially scan the sensor 201 by 2×2 pixel blocks so that the adjoining blocks do not overlap each other (in other words, the position of a block shifts by two pixels).

Further, in the image sensor 201 shown in FIG. 2, the complementary color filters are used; however, primary color filters may be used instead.

In this case, the reading circuit 202 obtains raw signals R corresponding to light passed through red color filters, raw signals Gr corresponding to light passed through green color filters, and raw signals B corresponding to light passed through blue color filters, and the raw signals R, G and B are stored in the memory 203 as shown in FIG. 5. Then, the matrix circuit $204_1$ calculates the pseudo luminance signal Y' using, e.g., the following equation (4), $$Y'=R+2G+B \quad (4)$$

The matrix circuit $204_2$ calculates the pseudo color difference signal U' using, e.g., the following equation (5), $$U'=R-Y' \quad (5)$$

Further, the matrix circuit $204_3$ calculates the pseudo color difference signal V' using, e.g., the following equation (6), $$V'=B-Y' \quad (6)$$

Furthermore, in the first embodiment, the DCT and the variable length coding are performed in the compression unit 20 as compression processing, however, the present invention is not limited to these, and code book compression technique (vector quantization technique), for instance, may be used instead.

When using the code book compression technique, the compression unit 20 first compares the pseudo luminance signal Y' and the pseudo color difference signals U' and V' which are obtained in the sensor unit 10 to a plurality of codes (patterns) which are stored in advance, searches the pattern closest to the pseudo luminance signal Y' and the pseudo color difference signals U' and V', then transmits the code number corresponding to the searched closest pattern to the expansion unit 30 of the reproduction apparatus.

In turn, the expansion unit 30 looks up the pattern corresponding to the code number, transmitted from the compression unit 20, from a plurality of codes which are stored in advance; thereby reproduces image signals compressed by the compression unit 20.

<Second Embodiment>

Figure 6:
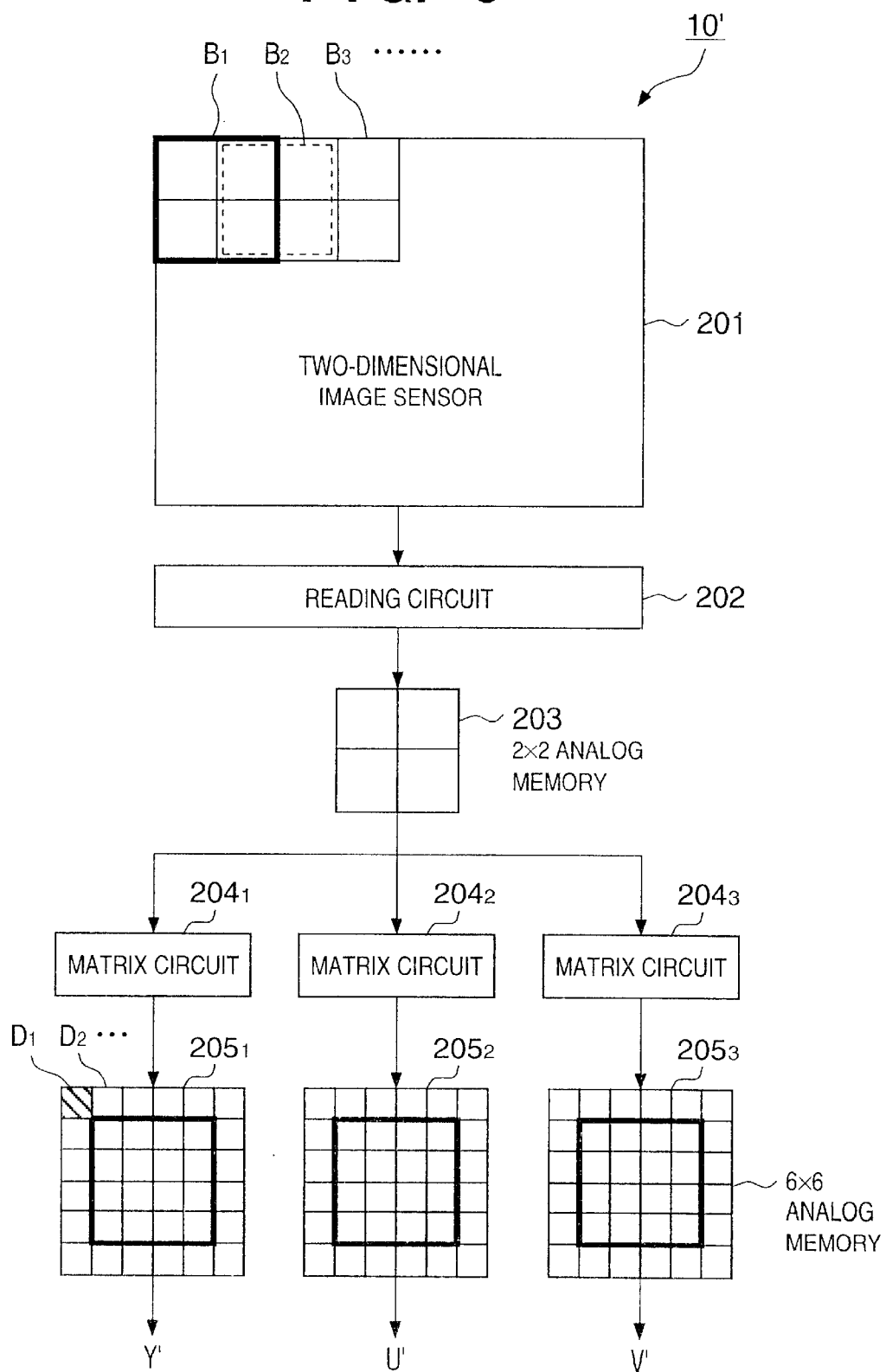
FIG. 6 is a block diagram illustrating another configuration of the sensor unit shown in FIG. 1 according to a second embodiment of the present invention.

In the second embodiment, the sensor unit 10 shown in FIG. 1 has a configuration as shown in FIG. 6. Since the configuration is different from the one shown in FIG. 2, in order to distinguish the sensor unit 10 of the second embodiment from that of the first embodiment, the sensor unit 10 is referred to by 10' hereinafter.

In the sensor unit 10', three analog memories $205_1$ to $205_3$ corresponding to the three matrix circuits $204_1$ to $204_3$ are further provided in addition to the configuration shown in FIG. 2. Further, in FIG. 6, the units and elements as those shown in FIG. 2 are referred to by the same reference numerals and explanation of them is omitted.

The analog memories $205_1$ to $205_3$ are included in the luminance/color difference pre-processing unit 13 shown in FIG. 1 according to the second embodiment.

The sensor unit 10' having this configuration operates as follows.

First, similarly to the sensor unit 10 shown in FIG. 2, the reading circuit 202 scans the image sensor 201 by four-pixel blocks ($B_1$, $B_2$, and so on) while shifting the position of a block by a pixel, thereby raw signals Ye, Cy, Mg and Gr are obtained and stored in the 2×2 analog memory 203. The matrix circuits $204_1$ to $204_3$ operates the signals Ye, Cy, Mg and Gr stored in the memory 203 using the aforesaid equations (1) to (3) to obtain a pseudo luminance signal Y' and pseudo color difference signals U' and V'.

The pseudo luminance signal Y' and the pseudo color difference signals U' and V' obtained by the matrix circuits $204_1$ to $204_3$ are respectively stored in the analog memories $205_1$ to $205_3$ at the same address.

The analog memories $205_1$ to $205_3$ have the same configuration, and have a size suitable to the compression unit 20 provided after the sensor unit 10. In the second embodiment, each of the analog memories $205_1$ to $205_3$ is 6×6 analog memory, as an example.

Figure 7:
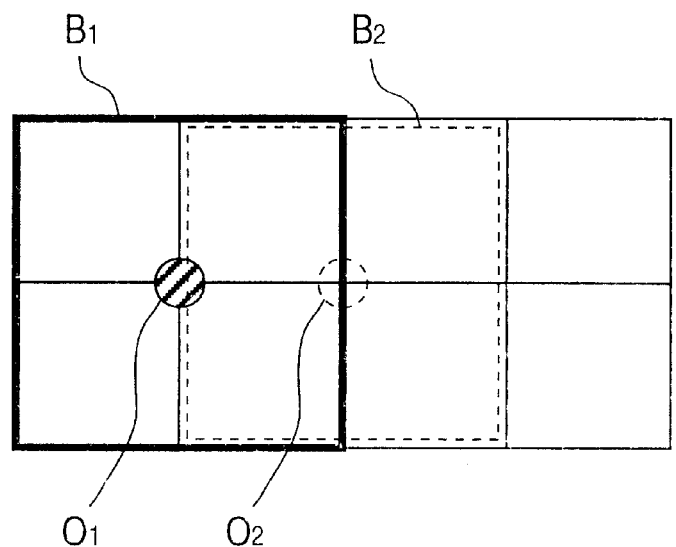
FIG. 7 is an explanatory view for explaining a position of block where data to be stored in 6×6 analog memory represents.

More specifically, in the analog memory $205_1$ as shown in FIG. 6, for instance, the pseudo luminance signal Y' generated from the raw signals of Ye, Cy, Mg and Gr corresponding to the pixels included in the first block $B_1$ of the image sensor 201 (i.e., an output from the matrix $204_1$) is stored at the upper leftmost address $D_1$ of the analog memory $205_1$. Thus, the data stored at the address $D_1$ conceptually represents the center of mass $O_1$ of the block $B_1$ as shown in FIG. 7.

Similarly, a pseudo luminance signal Y' generated from the raw signals of Ye, Cy, Mg and Gr corresponding to the pixels included in the second block $B_2$ is stored at the address $D_2$ next to the address $D_1$. The data stored at the address $D_2$ represents the center of mass $O_2$ of the block $B_2$ as shown in FIG. 7.

Thus, pseudo luminance signals Y' acquired by the matrix circuit $204_1$ are sequentially stored at corresponding addresses of the analog memory $205_1$ in the same manner.

Similarly, the color difference signals U' and V' are also stored in the analog memories $205_2$ and $205_3$ at corresponding 6×6 addresses.

Then, the pseudo luminance signals Y' and color difference signals U' and V' corresponding to 6×6 pixels stored in the respective analog memories $205_1$ to $205_3$ are outputted from the sensor unit 10'.

Accordingly, the pseudo luminance signals Y' and color difference signals U' and V' enter the compression unit 20, provided after the sensor unit 10', by 6×6 pixels, which is suitable for compression processing, in parallel or series.

According to the second embodiment as described above, the sensor unit 10' provides the pseudo luminance signals Y' and color difference signals U' and V' to the compression unit 20 by a size suitable for compression processing; thereby it is possible to further improve throughput.

Specifically, if the code book compression technique is adopted in the compression unit 20, the size of the analog memories $205_1$ to $205_3$ is set larger than the size of codes (e.g., 4×4 pixels) used by the a code book, and may be set to 6×6 pixels.

Accordingly, the pseudo luminance signals Y' and the color difference signals U' and V' are sequentially outputted by the size (e.g., 6×6 pixels) necessary for searching the code book for a code from the sensor unit 10'.

Figure 8:
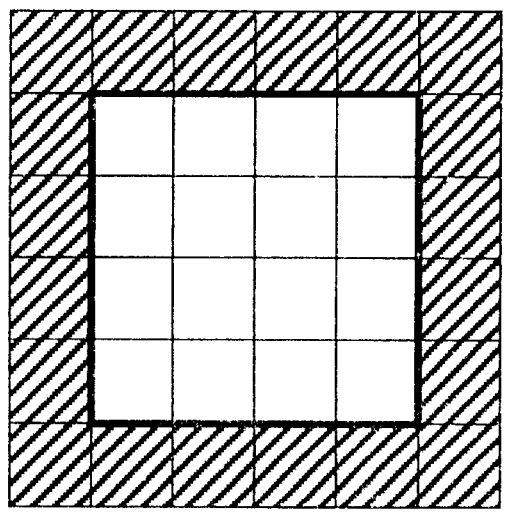
FIG. 8 is an explanatory view for explaining an output order of data from the sensor unit when code book compression technique is used in a compression unit.
Figure 9:
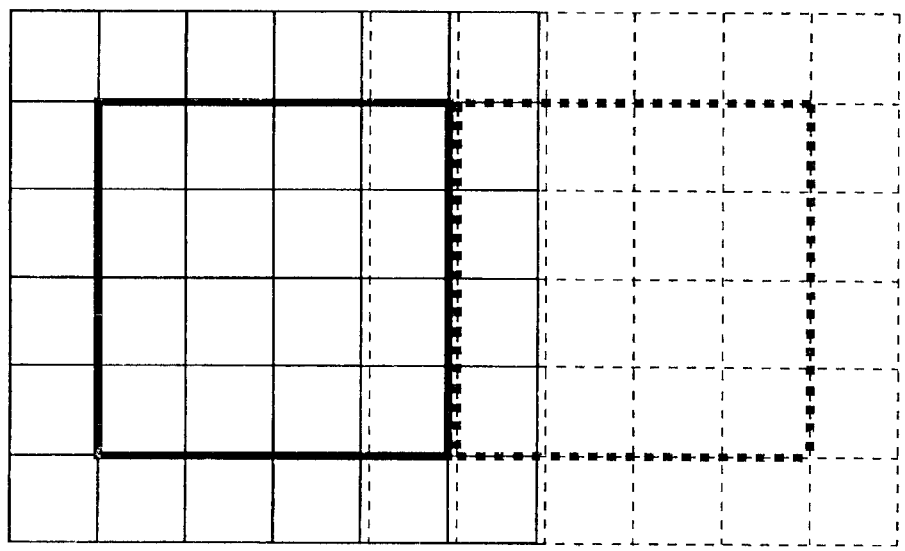
FIG. 9 is an explanatory view for explaining data to be coded in the code book compression technique.

In outputting the signals from the analog memories 205₁ to 205₃, signals of the central 4×4 pixels out of 6×6 pixels are outputted first, as shown in FIG. 8, then the signals of 20 outer pixels are outputted. Thereafter, the compression unit 20 searches the code book for a code corresponding to the central 4×4 pixels out of the 6×6 pixels outputted as shown in FIG. 8 so that the central 4×4 pixels of a set of 6×6 pixels adjoin the central 4×4 pixels of the next set of 6×6 pixels as shown in FIG. 9.

Accordingly, the compression unit 20 can start searching for a code in the code book method using pixel signals of a 6×6 pixel block without waiting too long before signals of 6×6 pixels are outputted by blocks, compared to the conventional image sensing apparatus which serially outputs pixel signals by line.

It is possible to sequentially scan the image sensor 201 once for each pixel by 2×2 pixel blocks (in other words, the position of a block shifts by two pixels. More specifically, referring to FIG. 6, after scanning the block $B_1$, the block $B_2$ is skipped, and the block $B_3$ is scanned); however, it is preferable to scan the image sensor 201 while shifting the position of the block by a pixel.

Figure 10:
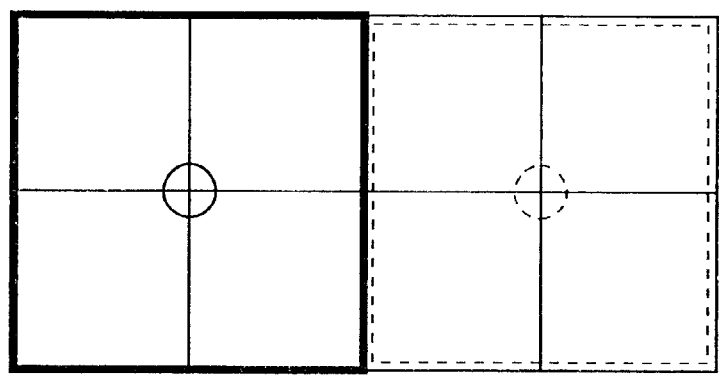
FIG. 10 is an explanatory view for explaining resolution of data obtained by shifting the position of a block by two pixels.

This is because, if the image sensor 201 is scanned once for each pixel by shifting the position of the block by two pixels, obtained data stored in each 6×6 analog memory results in representing every other pixels of the image sensor 201 as shown in FIG. 10; which deteriorates resolution. In this case, the resolution is decreased to ¼ comparing to a case of scanning the image sensor 201 while shifting the position of a block by a pixel, since, in the latter case, data stored in each 6×6 analog memory represents every pixel of the image sensor 201, as shown in FIG. 7.

<Third Embodiment>

In the third embodiment, another example of the sensor unit is explained.

Figure 11:
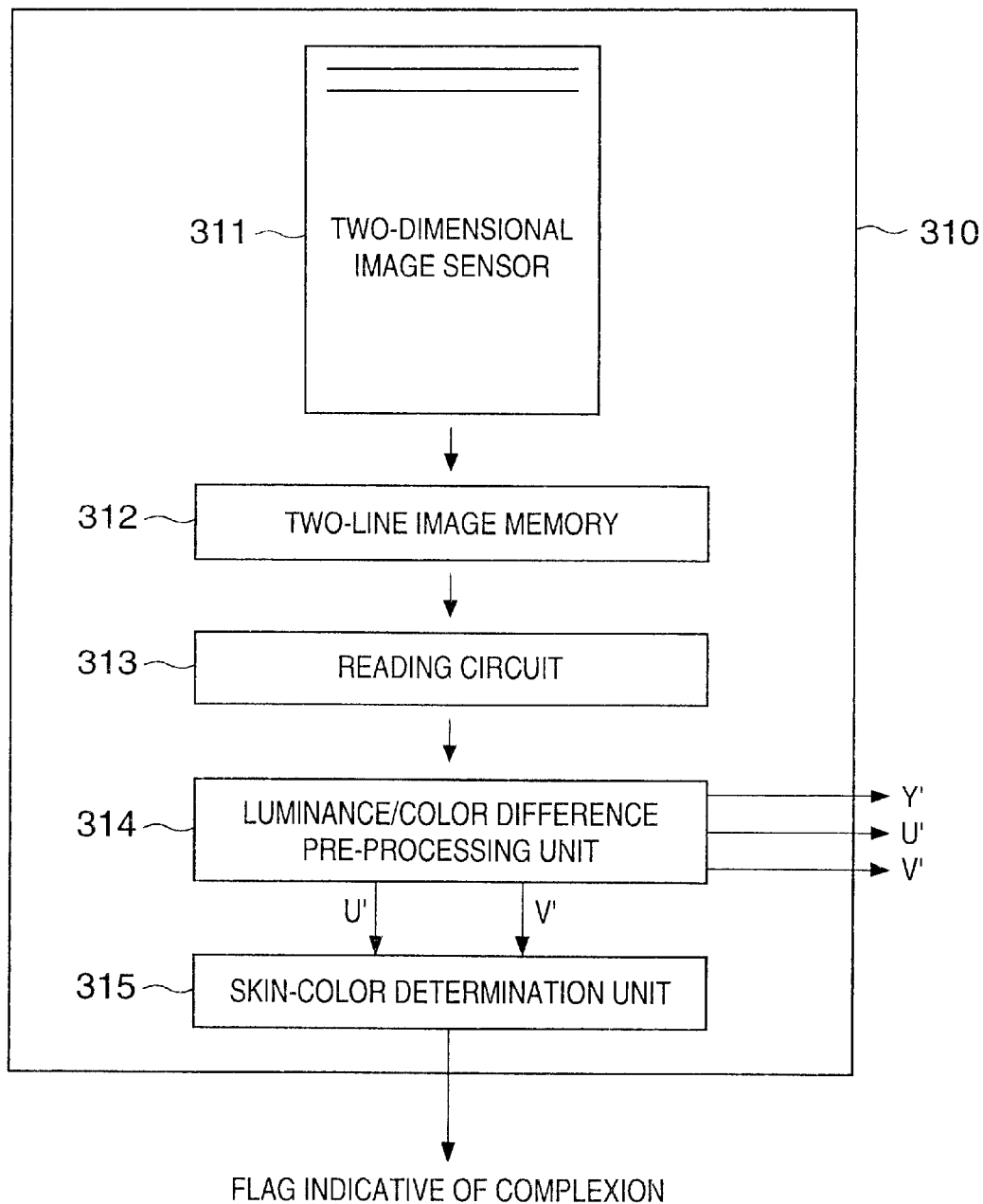
FIG. 11 is a block diagram illustrating a configuration of a sensor unit according to a third embodiment of the present invention.

FIG. 11 is a block diagram illustrating a configuration of a sensor unit 310 according to the third embodiment of the present invention. Referring to FIG. 11, the sensor unit 310 includes a two-dimensional image sensor (photoelectric conversion unit) 311, two-line image memory 312; a reading circuit 313; a luminance/color difference pre-processing unit 314; and a complexion determination circuit 315, all of which are formed on a single IC chip.

The sensor unit 310 of the third embodiment as described above has color filters covering the image sensor 311 for generating a pseudo (unprocessed) luminance signal Y' and pseudo color difference signals U' and V'.

Figures 12A, 12B:
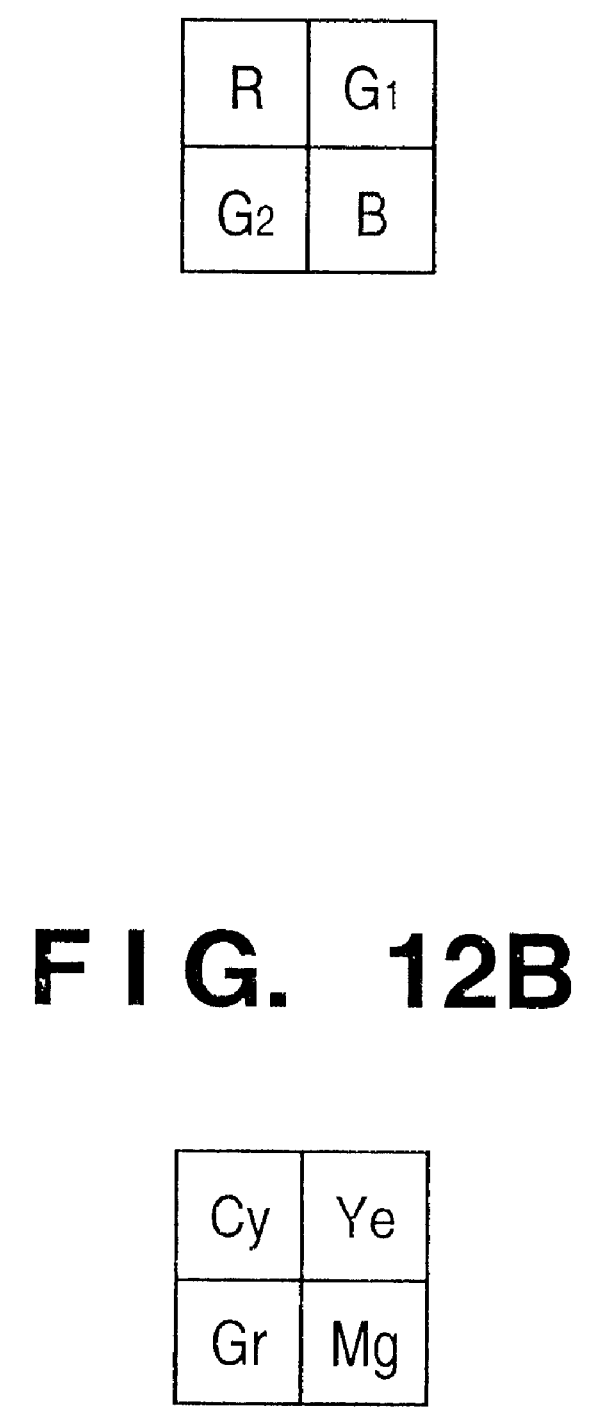

FIG. 12A shows an example of a basic unit of color filters provided over the image sensor 311, more specifically, the Bayer arrangement of primary color filters (R, $G_1$, $G_2$, B). In this arrangement, a pseudo luminance signal Y' is obtained by using, e.g., the following equation (7), $$Y'=0.3R+0.59G+0.11B \qquad (7)$$

and a pseudo color difference signal U' is obtained by using, e.g., the following equation (8), $$U'=R-Y' \qquad (8)$$

further, a pseudo color difference signal V' is obtained by using, e.g., the following equation (9)

$$V'=B-Y' \qquad (9)$$

Further, FIG. 12B shows an example of a basic unit of complementary color filters. In this arrangement, a pseudo luminance signal Y' and pseudo color difference signals U' and V' are obtained by using the aforesaid equations (1) to (3). Namely, the pseudo luminance signal Y' is obtained by $$Y'=Mg+Gr+Cy+Ye(=2B+3G+2R) \qquad (1)$$

Further, a pseudo color difference signal U' is obtained by $$U'=(Mg+Ye)-(Gr+Cy)(=2R-G) \qquad (2)$$

and a pseudo color difference signal V' is obtained by $$V'=(Gr+Ye)-(Mg+Cy)(=2B-G) \qquad (3)$$

The pixel signals outputted from the image sensor 311 which is converted by the color filters having the aforesaid color arrangement are provided to the two-line image memory 312 where signals of two lines are stored. Then, the stored signals are read out by the basic units of the color filters (i.e., 2×2 pixels) by the reading circuit 313 and provided to the luminance/color difference pre-processing unit 314.

Figure 13:
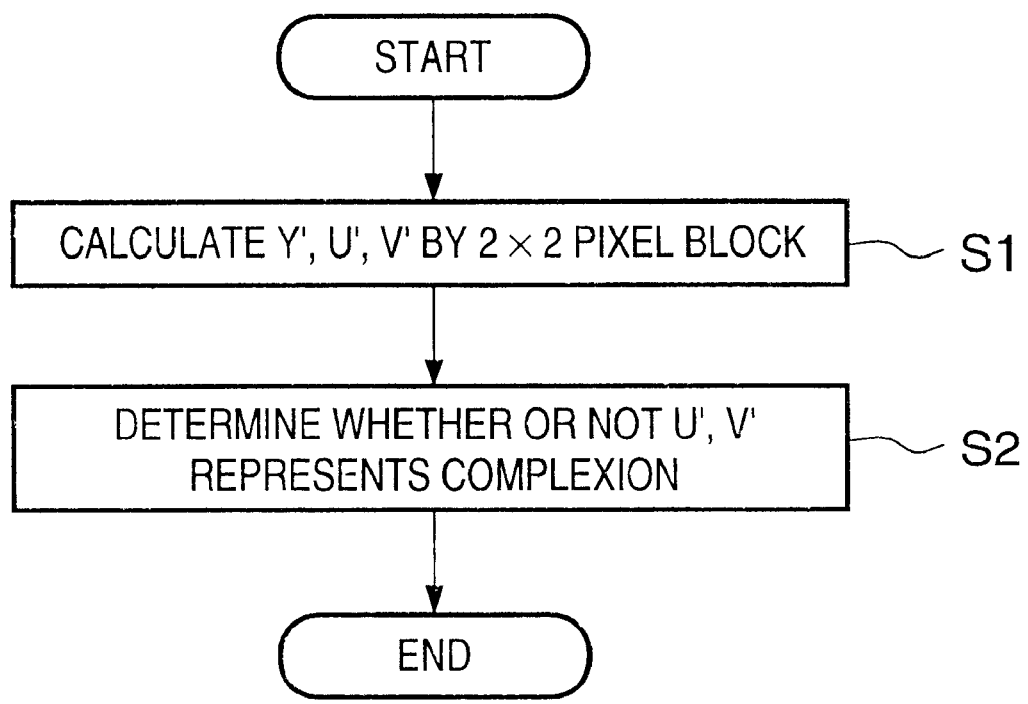
FIG. 13 is a flowchart showing operation of a luminance/color difference pre-processing unit and a complexion determination unit according to the third embodiment of the present invention.

The luminance/color difference pre-processing unit 314 performs matrix operation using the equations (7) to (9) or (1) to (3) on the pixel signals inputted by the basic blocks, generates pseudo luminance signal Y' and pseudo color difference signals U' and V', and outputs the generated signals to outside as well as outputs the pseudo color difference signals U' and V' to the complexion determination circuit 315 as shown in step S1 of the flowchart in FIG. 13.

Next, in step S2, the complexion determination circuit 315 determines whether a color represented by the pseudo color difference signals U' and V' is complexion or not by inputted pixel blocks (2×2 pixel blocks). In the third embodiment, threshold values for determining complexion are preset in the complexion determination circuit 315.

Figure 14:
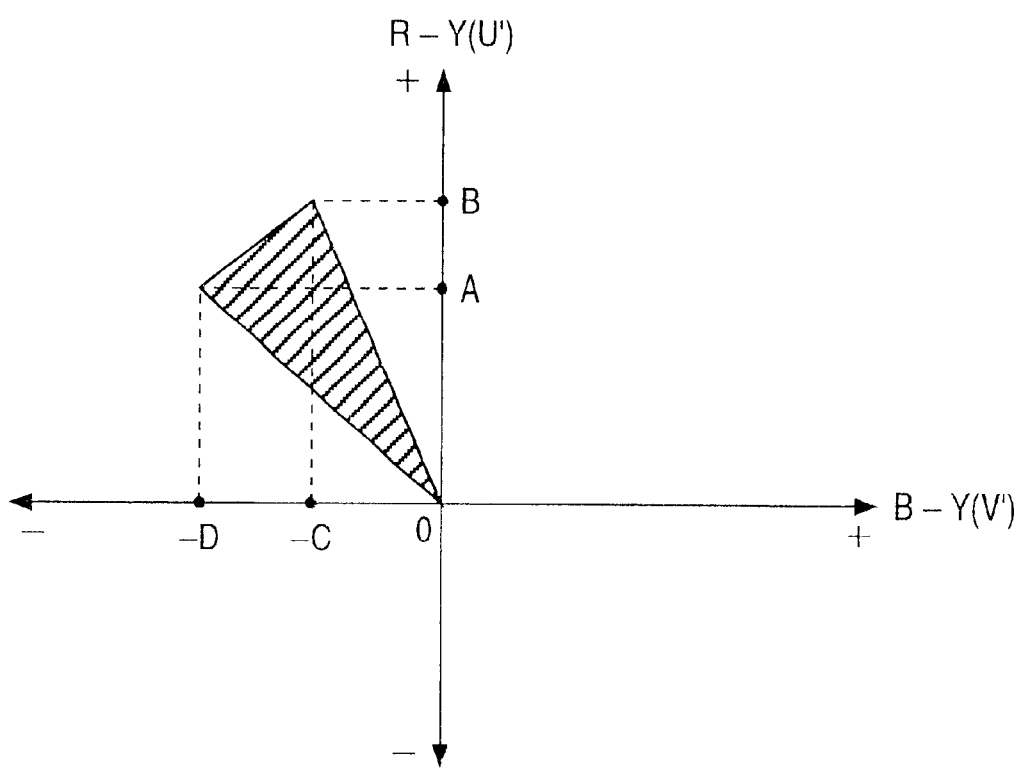
FIG. 14 is a graph for explaining complexion determination performed by the complexion determination unit according to the third embodiment of the present invention.

Specifically, as shown in FIG. 14, a first threshold A and a second threshold B are predetermined for the (R−Y) component, and a third threshold −D and a fourth threshold −C are predetermined for the (B−Y) component for the determination.

If the inputted pseudo color difference signals U' and V' and the four thresholds A, B, −C and −D satisfy the relationship, A<U'<B and −D<V'<−C, then the complexion determination circuit 315 determines that the color of the pixel block is complexion. In other words, the complexion determination circuit 315 determines whether or not the inputted signals U' and V' are within the area in FIG. 14 indicated by an oblique stripe pattern.

Figure 15:
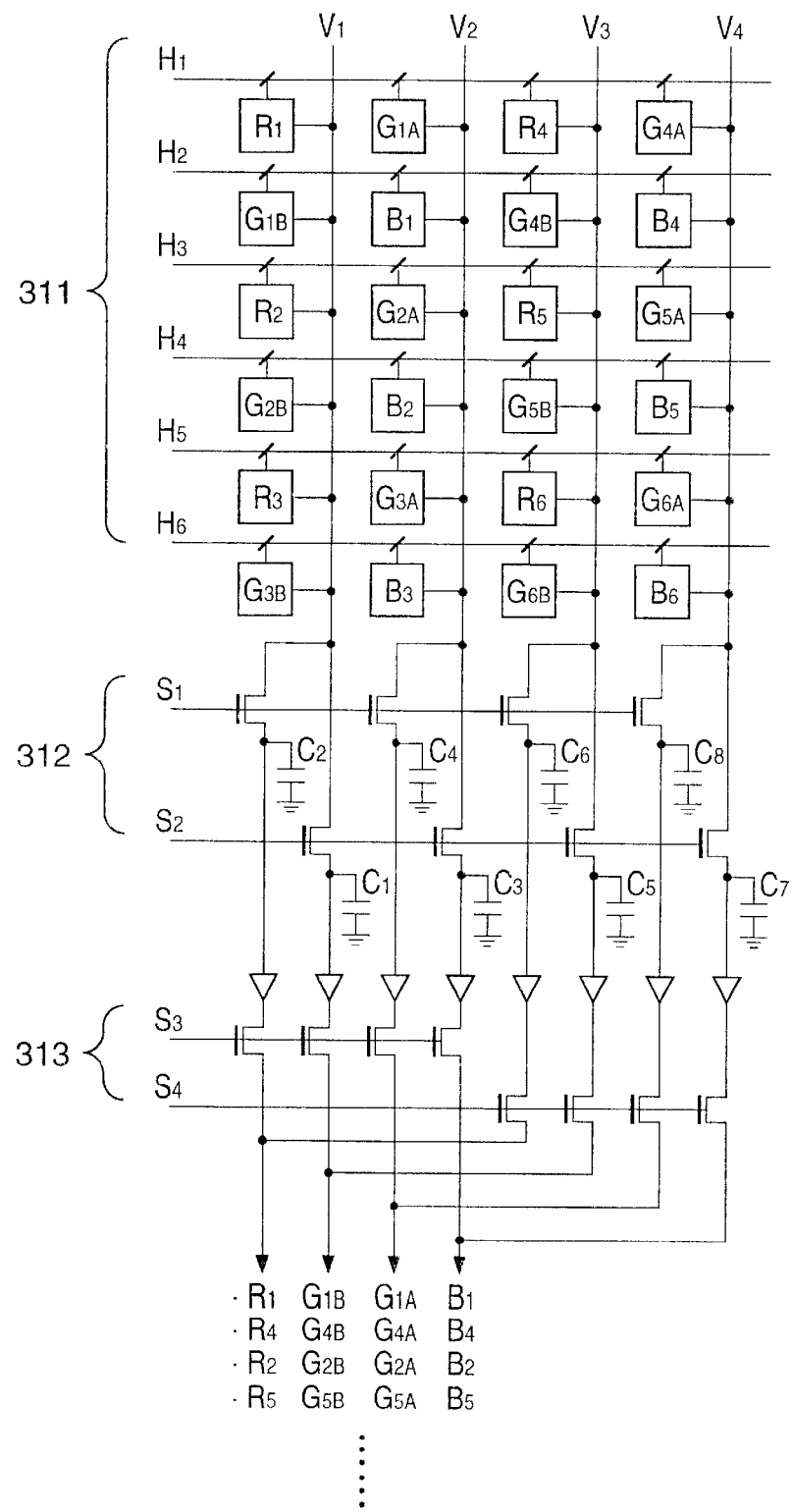
FIG. 15 is a circuit diagram illustrating a configuration of a two-dimensional image sensor, a two-line image memory, and a reading circuit, shown in FIG. 11, according to the third embodiment of the present invention.

FIG. 15 is a circuit diagram illustrating a configuration of the two-dimensional image sensor 311 covered with primary color filters, the two-line image memory 312, and the reading circuit 313. Referring to the circuit shown in FIG. 15, when a line $H_1$ becomes active, then charge accumulated in a pixel $R_1$ is transferred to a vertical output line $V_1$, charge accumulated in a pixel $G_{1A}$ is transferred to a vertical output line $V_2$, charge accumulated in a pixel $R_4$ is transferred to a vertical output line $V_3$, and charge accumulated in a pixel $G_{4A}$ is transferred to a vertical output line $V_4$. Note, the charges (pixel data) accumulated in the respective pixels are also referred to by the reference of corresponding pixels hereinafter.

Next, when a gate line $S_1$ of a transistor for reading is activated, the pixel data transferred to the respective vertical output lines $V_1$ to $V_4$ are stored in condensers $C_1$, $C_3$, $C_5$ and $C_7$, which functions as memory. More specifically, the pixel data $R_1$ is stored in the condenser $C_1$, the pixel data $G_{1A}$ is stored in the condenser $C_3$, the pixel data $R_4$ is stored in the condenser $C_5$, and the pixel data $G_{4A}$ is stored in the condenser $C_7$.

Thereafter, the gate line $S_1$ is deactivated and the vertical output lines $V_1$ to $V_4$ are reset, then a line $H_2$ is activated. In turn, charge accumulated in a pixel $G_{1B}$ is transferred to a vertical output line $V_1$, charge accumulated in a pixel $B_1$ is transferred to a vertical output line $V_2$, charge accumulated in a pixel $G_{4B}$ is transferred to a vertical output line $V_3$, and charge accumulated in a pixel $B_4$ is transferred to a vertical output line $V_4$.

Next, when a gate line $S_2$ of a transistor for reading is activated, the pixel data $G_{1B}$ on the vertical output line $V_1$ is stored in the condenser $C_2$, the pixel data $B_1$ on the vertical output line $V_2$ is stored in the condenser $C_4$, the pixel data $G_{4B}$ on the vertical output line $V_3$ is stored in the condenser $C_6$, and the pixel data $B_4$ on the vertical output line $V_4$ is stored in the condenser $C_8$.

After pixel data of two lines are stored in the condensers $C_1$ to $C_8$ (altogether configure the two-line image memory 312) in the aforesaid manner, reading operation by 2×2 pixel blocks is initiated. Specifically, when a gate line $S_3$ for transistors of the reading circuit 313 is activated, then the pixel data $R_1$, $G_{1B}$, $G_{1A}$ and $B_1$ stored in the condensers $C_1$ to $C_4$ are outputted in parallel.

Next, when a gate line $S_4$ for transistors of the reading circuit 313 is activated, then the pixel data $R_4$, $G_{4B}$, $G_{4A}$ and $B_4$ stored in the condensers $C_5$ to $C_8$ are outputted in parallel. The pixel data of the two-dimensional image sensor 311 is thus read out by 2×2 pixel blocks.

Figure 16:
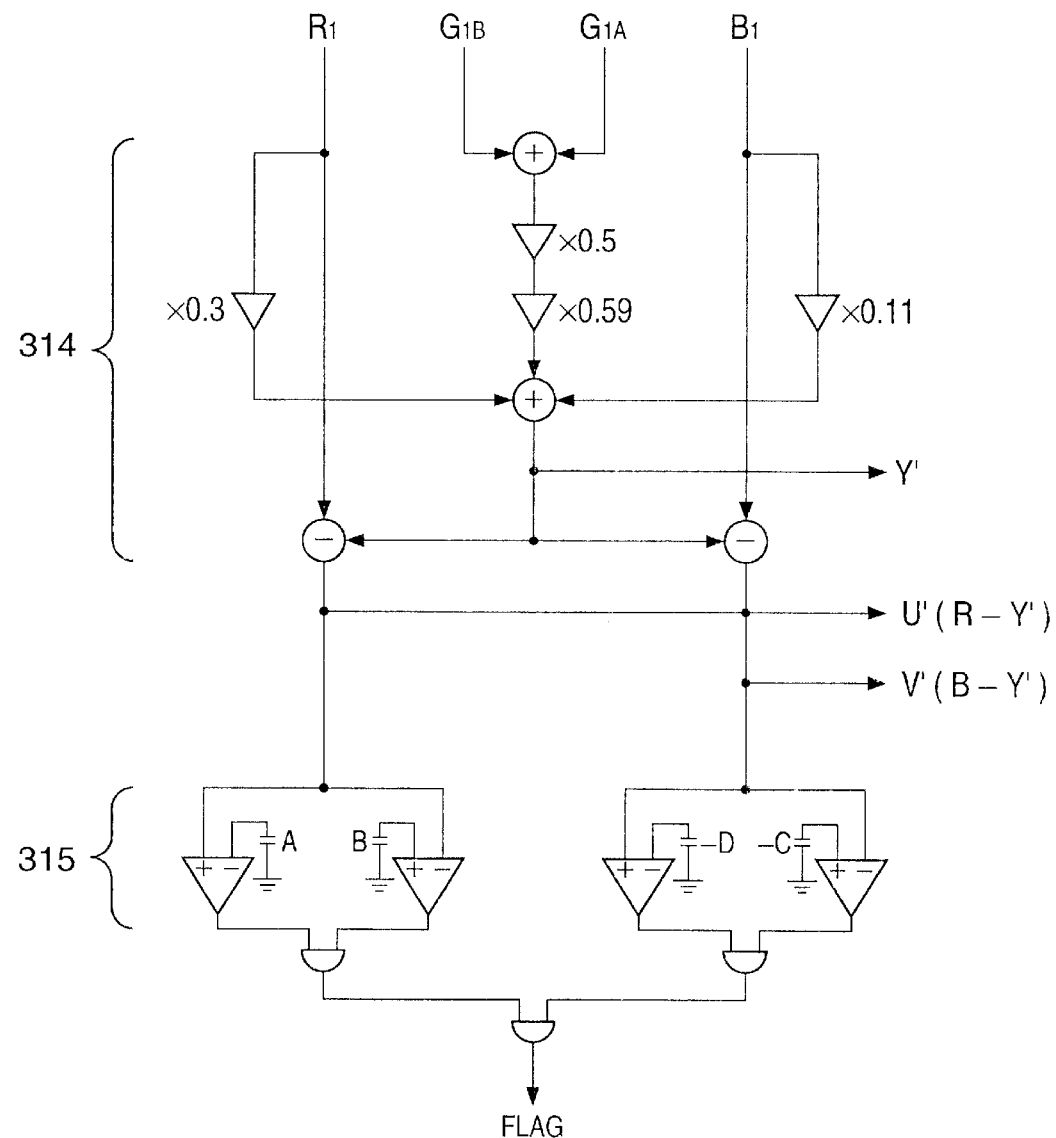
FIG. 16 is a circuit diagram illustrating a configuration of a luminance/color difference pre-processing unit and a complexion determination circuit, shown in FIG. 11, according to the third embodiment of the present invention.

FIG. 16 is a circuit diagram illustrating a configuration of the luminance/color difference pre-processing unit 314 and the complexion determination circuit 315. Referring to FIG. 16, after pixel data $R_1$, $G_{1B}$, $G_{1A}$ and $B_1$ are inputted to the luminance/color difference pre-processing unit 314, the pixel data $G_{1A}$ and $G_{1B}$ are added then multiplied by 0.5 to obtain the average. Further, the average is multiplied by 0.59, the pixel data $R_1$ is multiplied by 0.3, and the pixel data $B_1$ is multiplied by 0.11, and the obtained products are added, thereby a pseudo luminance signal Y' is generated. Thereafter, operations (R−Y') and (B−Y') are performed and pseudo color difference signals U' and V' are generated.

As described above, the acquired pseudo luminance signal Y' and the pseudo color difference signals U' and V' are outputted to outside of the sensor unit 310 as well as the pseudo color difference signals U' and V' are provided to the complexion determination circuit 315. The threshold values A, B, −C and −D are preset in the complexion determination circuit 315, as already described above, and the pseudo color difference signals U' and V' are compared to these threshold values, and when both of the conditions of A<U'<B and −D<V'<−C are satisfied, then the complexion determination circuit 315 determines the color of the pixel block represented by the input pseudo color difference signals U' and V' is complexion.

Figure 17:
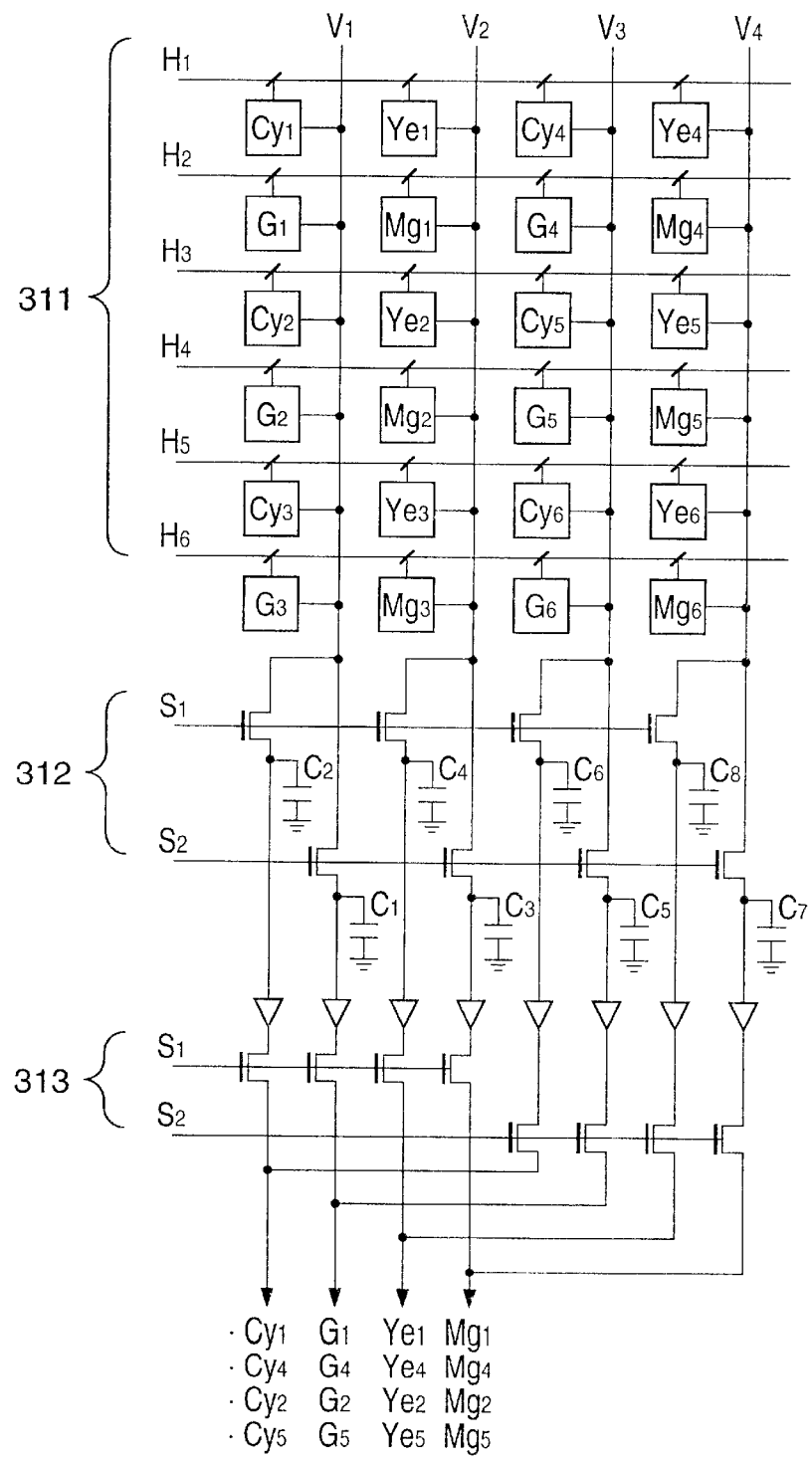
FIG. 17 is a circuit diagram illustrating another configuration of the two-dimensional image sensor, the two-line image memory, and the reading circuit, shown in FIG. 11, according to the third embodiment of the present invention.
Figure 18:
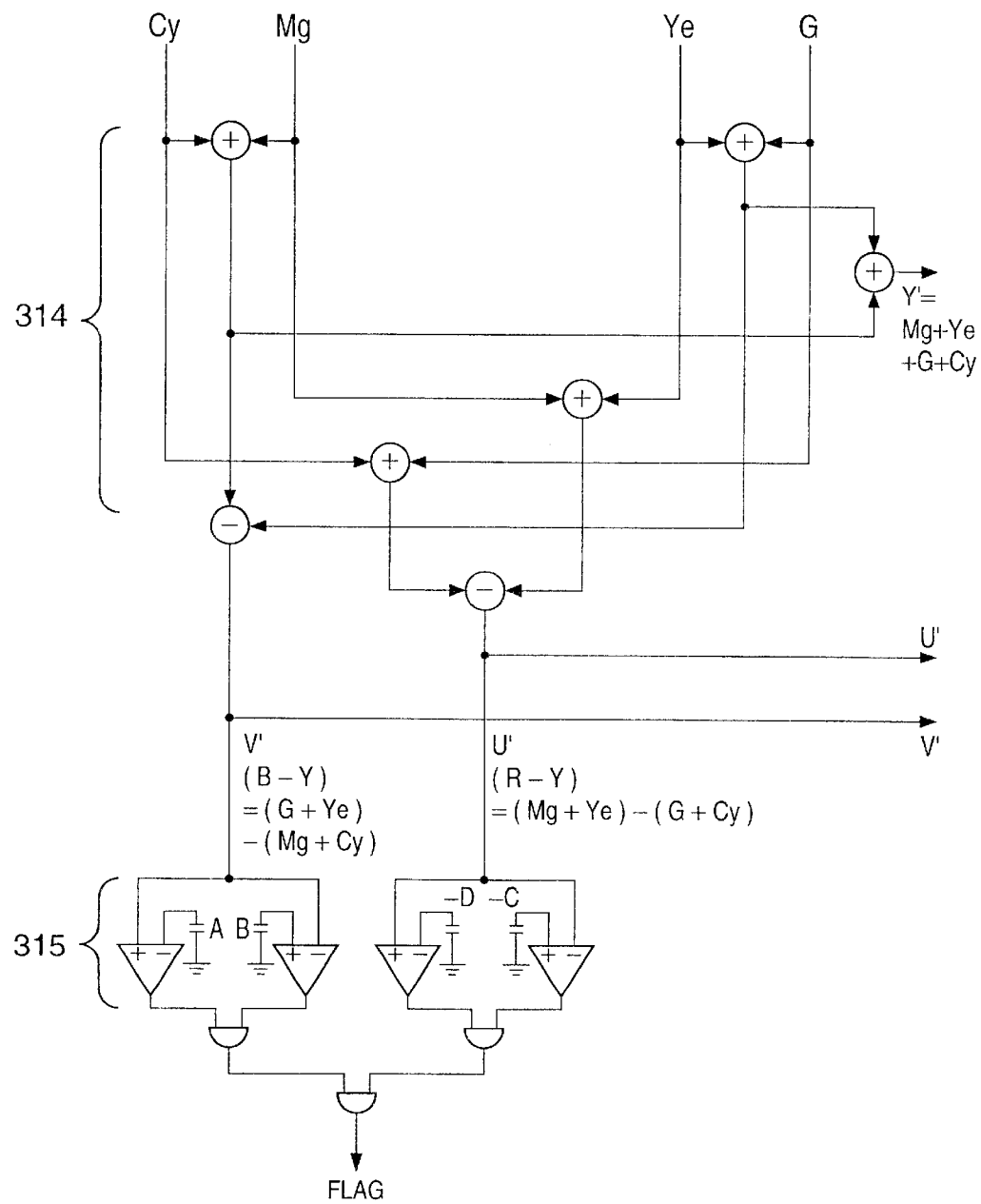
FIG. 18 is a circuit diagram illustrating another configuration of the luminance/color difference pre-processing unit and the complexion determination circuit, shown in FIG. 11, according to the third embodiment of the present invention.

FIG. 17 is a circuit diagram illustrating another configuration of the two-dimensional image sensor 311 covered with complementary color filters, the two-line image memory 312, and the reading circuit 313, and FIG. 18 is a circuit diagram illustrating another configuration of the luminance/color difference pre-processing unit 314 and the complexion determination circuit 315 when the complementary color filters are used. The circuit shown in FIG. 17 operates in the same manner as the circuit shown in FIG. 15, and the circuit shown in FIG. 18 operates in the same manner as the circuit shown in FIG. 16; therefore, the explanation of the operations is omitted.

FIGS. 19A to 19D are explanatory view for explaining an example of image processing which uses the complexion determination result.

Figure 19A:
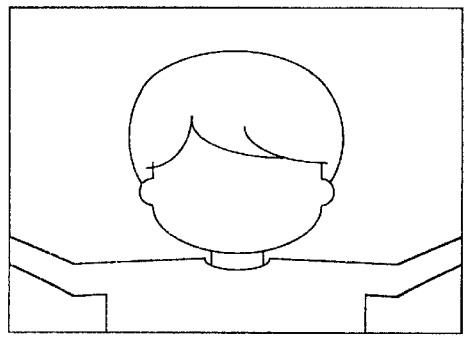
FIGS. 19A to 19D are explanatory view for explaining an example of image processing which uses the complexion determination result.
Figure 19B:
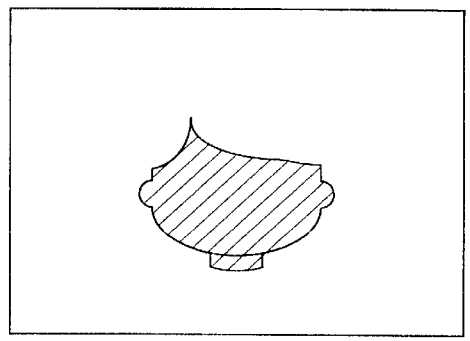
Figure 19C:
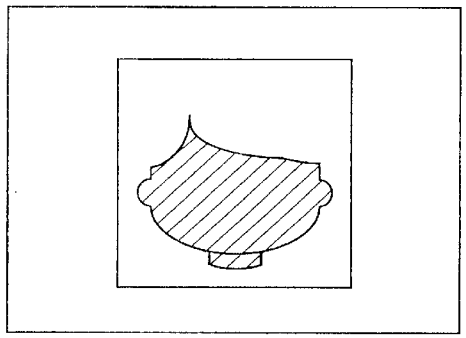
Figure 19D:
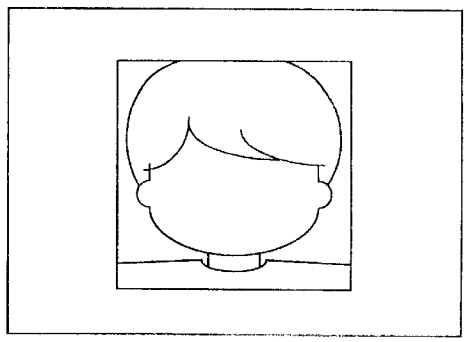

Referring to FIGS. 19A to 19D, in a reproduced image as shown in FIG. 19A, the complexion determination circuit 315 outputs flags for a complexion area, hatched in FIG. 19B. Then, an area including the complexion area is set in accordance with predetermined conditions as shown in FIG. 19C, and the face can be easily and precisely clipped from the reproduced image as shown in FIG. 19D.

Note, in the third embodiment, an example of determining complexion is explained; however, it is possible to determine arbitrary color other than complexion by setting different threshold values in the complexion determination circuit 315.

Further, in the third embodiment, the complexion determination is performed by basic units of the color filters, however, it is possible to obtain an average of pixel data of an n×m pixel block and determine whether or not the color of the pixel block is complexion from the pseudo color difference signals U' and V' which are generated on the basis of the average.

According to the third embodiment as described above, color is determined by pixel blocks of a predetermined size, thus, detection of arbitrary color in image signals outputted from the image sensor is performed easily and precisely.

Further, according to the third embodiment, color pre-processing, i.e., calculation of luminance and color difference signals, performed in general in advance of color image processes is performed in the sensor unit, it is possible to improve throughput as well as reduce the required memory size for performing the color image processes which are performed after the pre-processing.

Note, the image sensor described in the third embodiment is also applicable to the first and second embodiments, and vice versa.

<Fourth Embodiment>

Next, the fourth embodiment to which the sensor unit 310 of the third embodiment is applied is explained with reference to a block diagram shown in FIG. 20.

Figure 20:
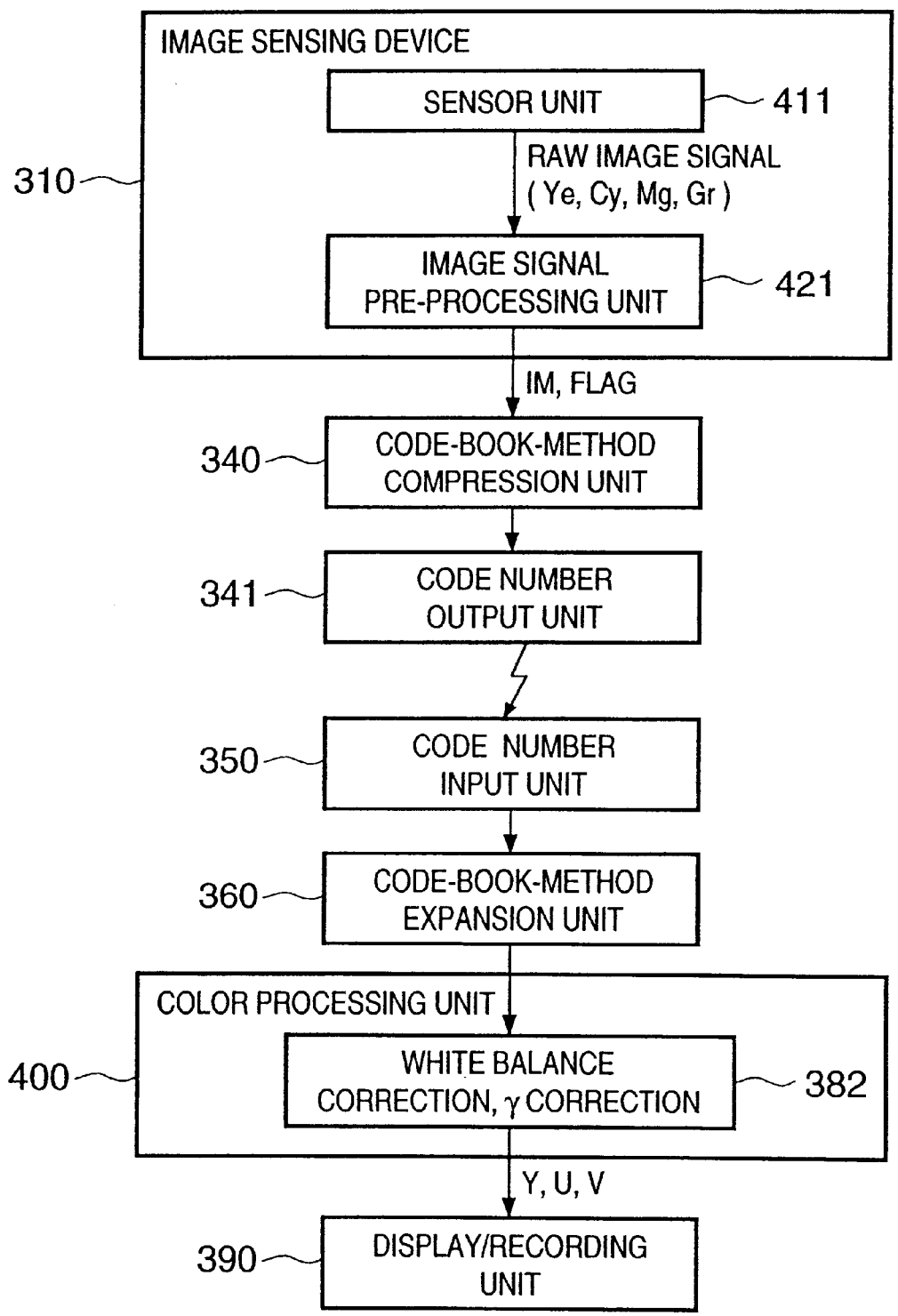
FIG. 20 is a block diagram illustrating a configuration of an image sensing system according to a fourth embodiment of the present invention.

FIG. 20 is a block diagram illustrating a configuration of an image sensing system using the sensor unit 310 of the third embodiment. Referring to FIG. 20, an image sensing apparatus (transmission side) of the image sensing system comprises the sensor unit 310, a code-book-method compression unit 340, and a code number output unit 341, and a reproduction apparatus (receiving side) of the image sensing system comprises a code number input unit 350, a code-book-method expansion unit 360, a color processing unit 400 and a display/recording unit 390.

The sensor unit 310 comprises an image sensing device 411 including the two-dimensional image sensor 311, the two-line image memory 312 and the reading circuit 313 which are shown in FIG. 11, and an image signal pre-processing unit 421 including the luminance/color difference pre-processing unit 314 and the complexion determination circuit 315 which are shown in FIG. 11. The sensor unit 310 outputs image signals IM (pseudo luminance signal Y' and pseudo color difference signals U' and V'), and complexion detection signals (flag).

The image signals IM outputted from the sensor unit 310 enter the code-book-method compression unit 340. The compression unit 340 compares the image signals IM of a predetermined number of pixels inputted from the sensor unit 310 to a plurality of codes (patterns) stored in code book memory (not shown). If the image signals IM of 1000×1000 pixels are outputted, the compression unit 340 compares the image signals IM by 4×4 pixel blocks, for instance, to code patterns of the code book if the code pattern is of a 4×4 array.

In the code book memory of the fourth embodiment, a plurality of codes having a predetermined size are stored, and, for searching for a code closest to the image signals, the compression unit 340 pre-searches codes representing complexion. The codes representing complexion may be stored in connection with a predetermined sign, or may be selected after determining colors expressed by the codes. Among the pre-searched codes, the code having the highest correlation with the inputted image signals is selected, and the code number of the selected code is outputted. The code number outputted from the compression unit 340 is transmitted from the code number output unit 341 to the code number input unit 350 via a medium, such as a communication line.

The code number transmitted via, e.g., the communication line enters the code number input unit 350 and provided to the code-book-method expansion unit 360. The code-book-method expansion unit 360 reads a pattern (code) corresponding to the input code number from code book memory (not shown), thereby reproduces image data compressed by the code-book-method compression unit 340.

The image signals IM reproduced by the expansion unit 360 is then provided to the color processing unit 400. The color processing unit 400 has a circuit 382 for performing various necessary corrections, such as color corrections of white balance correction and γ correction, for improving quality of an image on color information of the image signals IM.

Thus, the raw signals Ye, Cy, Mg and Gr inputted from the expansion unit 360 are applied with the predetermined color processes by the color processing unit 400; as a result, a luminance signal Y and color difference signals U and V are generated and outputted.

The luminance signal Y and the color difference signals U and V outputted from the color processing unit 400 are provided to the display/recording unit 390 where displayed on a display device and/or recorded on a recording medium.

Note, in the fourth embodiment, the code book method is used as information compression/expansion method, however, the present invention is not limited to this, and compression/expansion by discrete cosine transformation, quantization, variable length coding, for instance, may be performed instead.

According to the image sensing system of the fourth embodiment as described above, color correction processes for obtaining a high quality image are performed after the expansion process not before compression process which is a conventional sequence. Therefore, in addition to the advantages of the third embodiment, deterioration of an image due to block noise and high frequency noise caused by compression and expansion is reduced to a minimum, the amount of information to be transmitted via a communication line is greatly reduced, and deterioration of image signals, processed with color processes, due to compression/expansion is restrained; accordingly, it is possible to obtain a high quality image.

Further, since image signals are outputted by pixel blocks of a predetermined size suitable to compression processing from a sensor unit, it is possible to greatly increase precision and processing speed for compressing image signals outputted from the sensor unit.

Note, the image sensing system described in the fourth embodiment is also applicable to the first and second embodiments, and vice versa.

<Fifth Embodiment>

Next, the fifth embodiment will be explained with reference FIG. 21. In the fourth embodiment, the compressed signals are outputted externally via a medium, such as a communication line. In contrast, in the fifth embodiment, the compressed signals are temporarily recorded on a recording medium, reproduced, and applied with color processes after being expanded.

Figure 21:
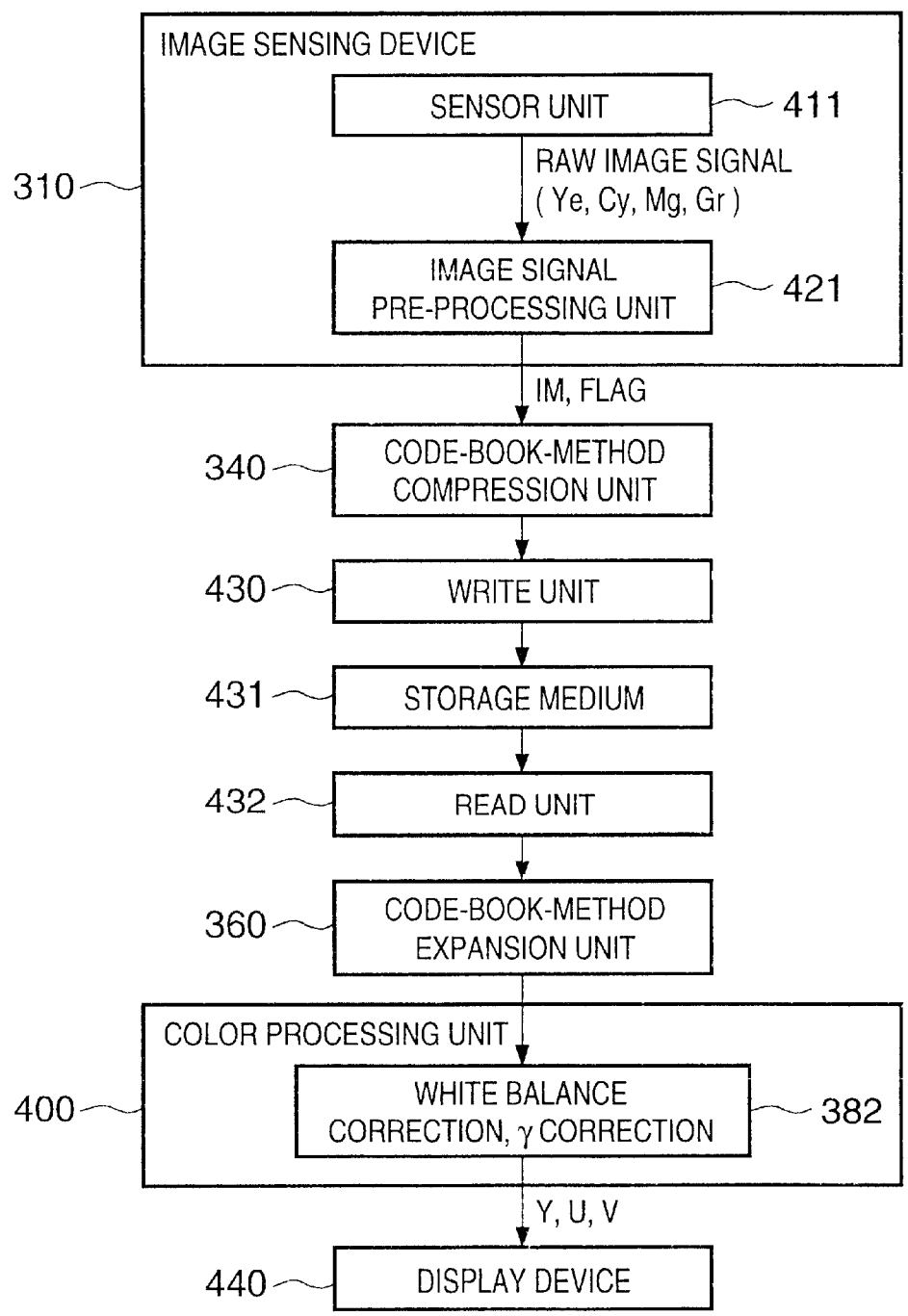
FIG. 21 is a block diagram illustrating a configuration of an image sensing apparatus according to a fifth embodiment of the present invention.
Figure 22:
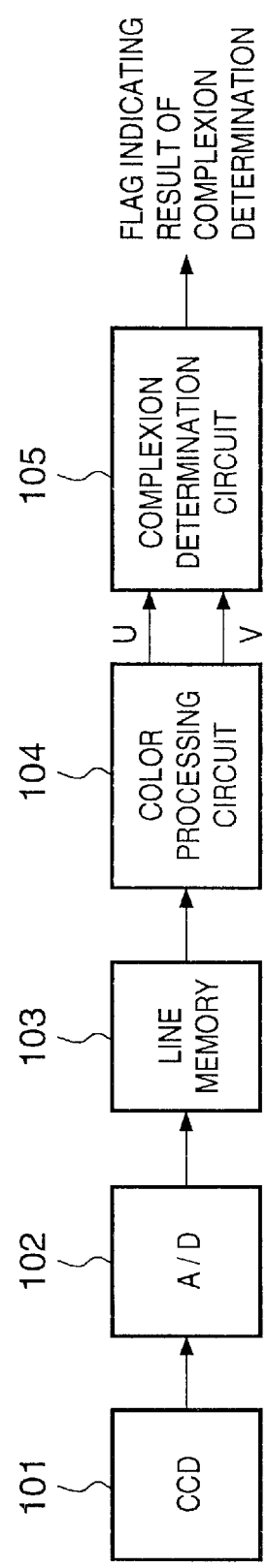
FIG. 22 is a block diagram illustrating a configuration of a conventional image sensing apparatus which performs complexion determination.

The difference between FIGS. 20 and 21 is that a write unit 430, a storage medium 431, and a read unit 432 are provided between the code-book-method compression unit 340 and the code-book-method expansion unit 360.

By configuring the apparatus as described above, required capacity of internal memory is further reduced since image signals IM from the image sensing device 310 are stored in the storage medium 431. In addition, since color processes, such as white balance correction and γ correction, are performed by the color processing unit 400 after the image signals, read from the storage medium 431, are expanded by the code-book-method expansion unit 360, deterioration of an image remains low, and it is possible to display a high quality image on a display device 440.

It should be noted that the image sensing apparatus according to the fifth embodiment may not include the read unit 432 and its subsequent units. In this case, the read unit 432, the code-book-method expansion unit 360, the color processing unit 400, and the display/recording unit 390 may be included in a reproducing apparatus (e.g., a personal computer).

Further, the code book method is used as compression/expansion method in the fourth embodiment, however, the present invention is not limited to this, and compression/expansion by discrete cosine transformation, quantization, variable length coding, for instance, may be performed instead.

According to the fifth embodiment as described above, it is possible to achieve the similar advantages as those of the fourth embodiment.

<Other Embodiment>

The object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. An image sensing device comprising:
   a sensor unit having a plurality of pixels arranged in two dimensions;
   a plurality of capacitors to which signals are transferred from said sensor unit;
   a controller adapted to independently and simultaneously read the signals from said plurality of capacitors by two-dimensional pixel blocks of a predetermined size; and
   a signal processor adapted to calculate luminance and color difference information on the basis of the signals, read from said plurality of capacitors under the control of said controller for each pixel block without processing the read signals with γ-correction,
   wherein said sensor unit, said plurality of capacitors, said controller and said signal processor are formed on a single IC chip, and said luminance and color difference information which has not undergone γ-correction is outputted from said IC chip.

2. The image sensing device according to claim 1, wherein said controller controls to read signals by pixel blocks so that at least two adjoining pixel blocks in the horizontal or vertical direction partially overlap each other.

3. The image sensing device according to claim 1, further comprising a color determination unit adapted to determine whether or not the color difference information calculated by said signal processor represents a predetermined color.

4. The image sensing device according to claim 3, wherein a determination result provided by said color determination unit is outputted in synchronization with a time of outputting the luminance and color difference information from said signal processor.

5. The image sensing device according to claim 3, wherein first to fourth threshold values, TH1 to TH4, are preset in said color determination unit, and, for a (R−Y) component and a (B−Y) component of the color difference information, when both equations $$TH1 < (R-Y) < TH2$$

$$TH3 < (B-Y) < TH4$$

are satisfied, said color determination unit determines that the color difference information represents the predetermined color.

6. The image sensing device according to claim 3, wherein the predetermined color is complexion.

7. The image sensing device according to claim 1, further comprising memory for storing the luminance and color difference information calculated by said signal processor representing a predetermined amount for a pixel group.

8. The image sensing device according to claim 7, wherein the luminance and color difference information calculated by said signal processor is outputted to an external signal processing apparatus, and the predetermined amount of the information to be stored in said memory is set depending upon the external signal processing apparatus.

9. An image sensing apparatus comprising:
   a sensor unit having a plurality of pixels;
   a plurality of capacitors to which signals are transferred from said sensor unit;
   a controller adapted to control to independently and simultaneously read the signals from said plurality of capacitors two-dimensional by pixel blocks of a predetermined size;
   a signal processor adapted to calculate luminance and color difference information on the basis of the signals, read from said plurality of capacitors under the control of said controller for each pixel block without processing the transferred signals with γ-correction,
   wherein said sensor unit, said plurality of capacitors, said controller and said signal processor are formed on a single IC chip, and said luminance and color difference information which has not undergone γ-correction is outputted from said IC chip; and
   a compression unit adapted to compress the luminance and color difference information calculated by said signal processor.

10. The image sensing apparatus according to claim 9, wherein said controller controls to read signals by pixel blocks so that at least two adjoining pixel blocks in the horizontal or vertical direction partially overlap each other.

11. The image sensing apparatus according to claim 9, further comprising a color determination unit adapted to determine whether the color difference information calculated by said signal processor represents a predetermined color.

12. The image sensing apparatus according to claim 4, wherein a determination result provided by said color determination unit is outputted in synchronization with a time of outputting the luminance and color difference information from said signal processor.

13. The image sensing apparatus according to claim 11, wherein first to fourth threshold values, TH1 to TH4, are preset in said color determination unit, and, for a (R−Y) component and a (B−Y) component of the color difference information, when both equations $$TH1 < (R-Y) < TH2$$

$$TH3 < (B-Y) < TH4$$

are satisfied, said color determination unit determines that the color difference information represents the predetermined color.

14. The image sensing apparatus according to claim 11, wherein the predetermined color is complexion.

15. The image sensing apparatus according to claim 9, further comprising memory for storing the luminance and color difference information calculated by said signal processor representing a predetermined amount for a pixel group.

16. The image sensing apparatus according to claim 15, wherein the predetermined amount of the information to be stored in said memory is set depending upon compression process performed by said compression unit.

17. The image sensing apparatus according to claim 9, wherein said compression unit performs code-book vector quantization.

18. The image sensing apparatus according to claim 9, wherein said compression unit performs either discrete cosine transformation, quantization, or variable length coding.

19. The image sensing apparatus according to claim 9, further comprising an output unit adapted to output the luminance and color difference information compressed by said compression unit.

20. The image sensing apparatus according to claim 9, further comprising a write unit adapted to write the luminance and color difference information compressed by said compression unit in a storage medium.

21. The image sensing apparatus according to claim 20, further comprising:

a read unit adapted to read the compressed luminance and color difference information from the storage medium;

an expansion unit adapted to expand the compressed luminance and color difference information read by said read unit; and a color signal processor adapted to apply color processes including at least white balance correction or γ correction to signals expanded by said expansion unit.

22. The image sensing apparatus according to claim 21, wherein said compression unit performs code-book vector quantization, and said expansion unit performs an inverse operation of code-book vector quantization.

23. The image sensing apparatus according to claim 21, wherein said compression unit performs either discrete cosine transformation, quantization, or variable length coding and said expansion unit performs an inverse operation of the compression performed by said compression unit.

* * * * *

UNITED STATES PATENT AND TRADEMARK OFFICE
CERTIFICATE OF CORRECTION

PATENT NO. : 6,684,000 B1
DATED : January 27, 2004
INVENTOR(S) : Katsuhito Sakurai et al.

It is certified that error appears in the above-identified patent and that said Letters Patent is hereby corrected as shown below:

Column 2,
Line 6, "considerably" should read -- a considerably --; and
Line 8, "to increase" should read -- increases in --.

Column 3,
Line 2, "block where" should read -- the block corresponding to the --;
Line 2, 'memory" should read -- memory; --;
Line 22, "represents;" should be deleted; and
Line 65, "view" should read -- views --.

Column 4,
Line 49, "transform" should read -- transformation --; and
Line 65, "quntization" should read -- quantization --

Column 5,
Line 62, "signal" should read -- signals --.

Column 8,
Line 13, "thereby' should read -- whereby -;
Line 14, "operates" should read -- operate on --; and
Line 64, "a" should be deleted.

Column 9,
Line 28, "pixels" should read -- pixel --.

Column 11,
Line 65, "view" should read -- views --.

Column 13,
Line 12, "provided" should read -- is provided --; and
Line 64, "FIG. 21." should read -- to FIG. 21. --.

Column 14,
Lien 50, "are" should read -- been --;
Line 54, "processes" should read -- process --; and
Line 55, "realize" should read -- realizes --.

UNITED STATES PATENT AND TRADEMARK OFFICE
CERTIFICATE OF CORRECTION

PATENT NO. : 6,684,000 B1
DATED : January 27, 2004
INVENTOR(S) : Katsuhito Sakurai et al.

It is certified that error appears in the above-identified patent and that said Letters Patent is hereby corrected as shown below:

<u>Column 16,</u>
Line 1, "two-dimensional by" should read -- by two-dimensional --;
Line 25, "claim 4," should read -- claim 11, --; and
Line 51, "upon" should read -- upon a --.

Signed and Sealed this

Seventeenth Day of August, 2004

JON W. DUDAS
*Acting Director of the United States Patent and Trademark Office*